(12) United States Patent
Van Der Linden

(10) Patent No.: US 10,124,665 B2
(45) Date of Patent: Nov. 13, 2018

(54) AERODYNAMIC AND ADJUSTABLE EFFICIENT BACK OF CAB FUEL TANK HOUSING

(71) Applicant: Quantum Fuel Systems LLC, Lake Forest, CA (US)

(72) Inventor: Paul Van Der Linden, Lake Forest, CA (US)

(73) Assignee: Quantum Fuel Systems LLC, Lake Forest, CA (US)

( * ) Notice: Subject to any disclaimer, the term of this patent is extended or adjusted under 35 U.S.C. 154(b) by 0 days.

(21) Appl. No.: 15/369,688

(22) Filed: Dec. 5, 2016

(65) Prior Publication Data

US 2017/0080798 A1   Mar. 23, 2017

Related U.S. Application Data

(63) Continuation of application No. PCT/US2015/035421, filed on Jun. 11, 2015.

(60) Provisional application No. 62/011,385, filed on Jun. 12, 2014.

(51) Int. Cl.
    *B60K 15/07*    (2006.01)
    *B62D 35/00*    (2006.01)
    *B60K 15/063*   (2006.01)

(52) U.S. Cl.
    CPC ............ *B60K 15/07* (2013.01); *B62D 35/001* (2013.01); *B60K 2015/0638* (2013.01); *B60Y 2200/14* (2013.01); *B60Y 2200/145* (2013.01)

(58) Field of Classification Search
    CPC .............................. B60K 15/07; B62D 35/001
    USPC ................................ 296/180.1, 180.2, 180.3
    See application file for complete search history.

(56) References Cited

U.S. PATENT DOCUMENTS

| | | | |
|---|---|---|---|
| 4,121,684 A | 10/1978 | Stephens et al. | |
| 4,311,334 A | 1/1982 | Jenkins | |
| 4,462,628 A * | 7/1984 | Gregg | B62D 35/001 296/180.3 |
| 4,775,179 A * | 10/1988 | Riggs | B62D 33/0612 296/180.2 |
| 5,058,837 A | 10/1991 | Wheeler | |
| 5,078,448 A | 1/1992 | Selzer et al. | |
| 7,876,202 B2 * | 1/2011 | Liljeblad | B62D 35/001 296/155 |
| 2005/0189786 A1* | 9/2005 | Spence | B62D 35/001 296/180.2 |
| 2009/0160214 A1* | 6/2009 | Alguera | B62D 35/001 296/180.3 |
| 2012/0313348 A1 | 12/2012 | Pfaff | |
| 2014/0061266 A1 | 3/2014 | Milton et al. | |
| 2014/0137953 A1* | 5/2014 | Gibb | F17C 1/00 137/351 |

OTHER PUBLICATIONS

International Patent Application No. PCT/US2015/035421; Int'l Preliminary Report on Patentability; dated Dec. 22, 2016; 14 pages.

* cited by examiner

*Primary Examiner* — Jason S Daniels
(74) *Attorney, Agent, or Firm* — Baker & Hostetler LLP

(57) ABSTRACT

A back of cab enclosure which covers vertically mounted fuel tanks and manages airflow wherein laminar airflow is improved and turbulent airflow is decreased.

16 Claims, 7 Drawing Sheets

AERODYNAMIC AND ADJUSTABLE EFFICIENT BACK OF CAB FUEL TANK HOUSING

CROSS REFERENCE TO RELATED APPLICATIONS

This application is a Continuation of International Patent Application No. PCT/US2015/035421, filed Jun. 11, 2015, which claims priority to U.S. Provisional Patent Application 62/011,385, filed Jun. 12, 2014, the contents of which are incorporated herein by reference in their entirety.

BACKGROUND

1. Field

This disclosure relates to a multifunction enclosure to protect fuel tanks mounted behind a tractor cab.

2. General Background

Pressurized cylinders are useful; for storing and transporting fuels such as hydrogen, natural gas (CNG) and propane. Storage of gaseous fuel cylinders/tanks in a tractor or trailer must meet crash safety requirements. Tractor Trailers have many different weight ratings which may affect their usage and the cost of usage. Gross Vehicle Weight (GVW). This is the total weight of the loaded vehicle. This includes the vehicle itself and the cargo that is loaded on the vehicle. Gross Combination Weight (GCW). This is specified by the manufacturer as the maximum loaded weight of a truck/tractor plus the trailer or semi-trailer designed for use with the truck/tractor. Gross Vehicle Weight Rating (GVWR). This is the rating that is calculated by the manufacturer as the amount of weight that the vehicle will be when the vehicle itself is weighed filled with fuel and loaded according to the manufacturer's specification.

Gross Combination Weight Rating (GCWR). This is the maximum allowable combined mass of a towing road vehicle, passengers and cargo in the tow vehicle, plus the mass of the trailer and cargo in the trailer. This rating is set by the manufacturer.

Any vehicle operating interstate with a GVW or GCW or registered weight of 26,000 lbs. or more, or having three axles at any weight, is subject to the International Registration Plan (IRP) for apportioned registration and the International Fuel Tax Agreement (IFTA) for payment of fuel use taxes. These base state agreements do not use the vehicle weight rating when determining compliance.

Highway Weight. This is the legal weight related to highway size and weight limits. When operating on the interstate system, the maximum permissible weight is 20,000 lbs. on a single axle, 34,000 lbs. on a tandem axle, and 80,000 lbs. max gross weight. The "Bridge Formula" allows motor vehicles to be loaded to the maximum weight only if each group of axles on the vehicle and their spacing also satisfy the requirements of the formula. States must use these limits for their designated or national network highways. While the majority of the states use the federal bridge formula for all roads in their state, some do have a separate state formula for other state or county roads.

Weight costs fuel and reduce load carrying capacity. Turbulent airflow around a tractor trailer increases the drag coefficient and reduces mileage. Improving laminar airflow is a design goal in most modern motor vehicle designs. FIG. 1 shows fuel system 5 of gaseous fuel tanks 10 secured to a rack 15. The fuel system 5 is secured behind a tractor cab. Valves 18 on the end of the tank are used to provide an outlet for supplying gaseous fuel. The valves should be protected during transport of the tanks behind a tractor.

DISCLOSURE

Briefly, gaseous fuel stored in cylinders on a tractor and/or trailer adds weight. Weight affects cost to operate and regulatory issues. Moreover, such tanks are an expensive part of the tractor trailer infrastructure and should be protected from tampering and the environment.

Disclosed herein are systems, devices and methods of multifunction a lightweight enclosure which covers and protects gaseous fuel tanks and improves aerodynamics of the tractor trailer fitted with gaseous fuel tanks.

Disclosed herein are aspects of exemplary implementations of aerodynamic system to protect tanks behind a cab including covering a fuel system containing gaseous fuel tanks on a rack with an enclosure having an outer surface of a size and shape to fit over said fuel system. In some instances the enclosure further comprising at least one of a window, door, vent, hatch and panel whereby at least the tanks and valves may be viewed or accessed. The enclosure may also have an interior buffer region or lining to protect the tanks and/or strength the structure of the enclosure.

Disclosed herein are aspects of exemplary implementations of an aerodynamic system to protect a behind the cab fuel system containing gaseous fuel tanks on a rack with a unitary piece enclosure having an outer surface of a size and shape to fit over said fuel system and the outer surface of enclosure has at least one of the following surface features dimples, bumps, creases, sharp edges and/or one or more sections or portions of the enclosure or parts that are connected together to form the enclosure are concave or convex. In some instances at least one duct may be added.

The above disclosed system fits between the back of a tractor cab and the front of a trailer. An air gap will exist between the back of the enclosure and the trailer. The selection of, and position of shape and contours of the enclosure teach a method to reduce turbulent airflow between the enclosure and the trailer. Reductions in turbulent airflow or improvements in laminar airflow of a vehicle travelling on a highway has been shown to improve fuel efficiency of the vehicle. The shape may include an extension to reduce the size of the air gap. The enclosure may also have an adjustable topper hinged to the front of an enclosure and, wherein the topper may be rotated along a hinge to select an angle or inclination and height and then fixed in place at the angle of inclination and height relative to at least one of the tractor, cab and trailer.

DRAWINGS

The above-mentioned features of the present disclosure will become more apparent with reference to the following description taken in conjunction with the accompanying drawings wherein like reference numerals denote like elements and in which.

Figure 1:
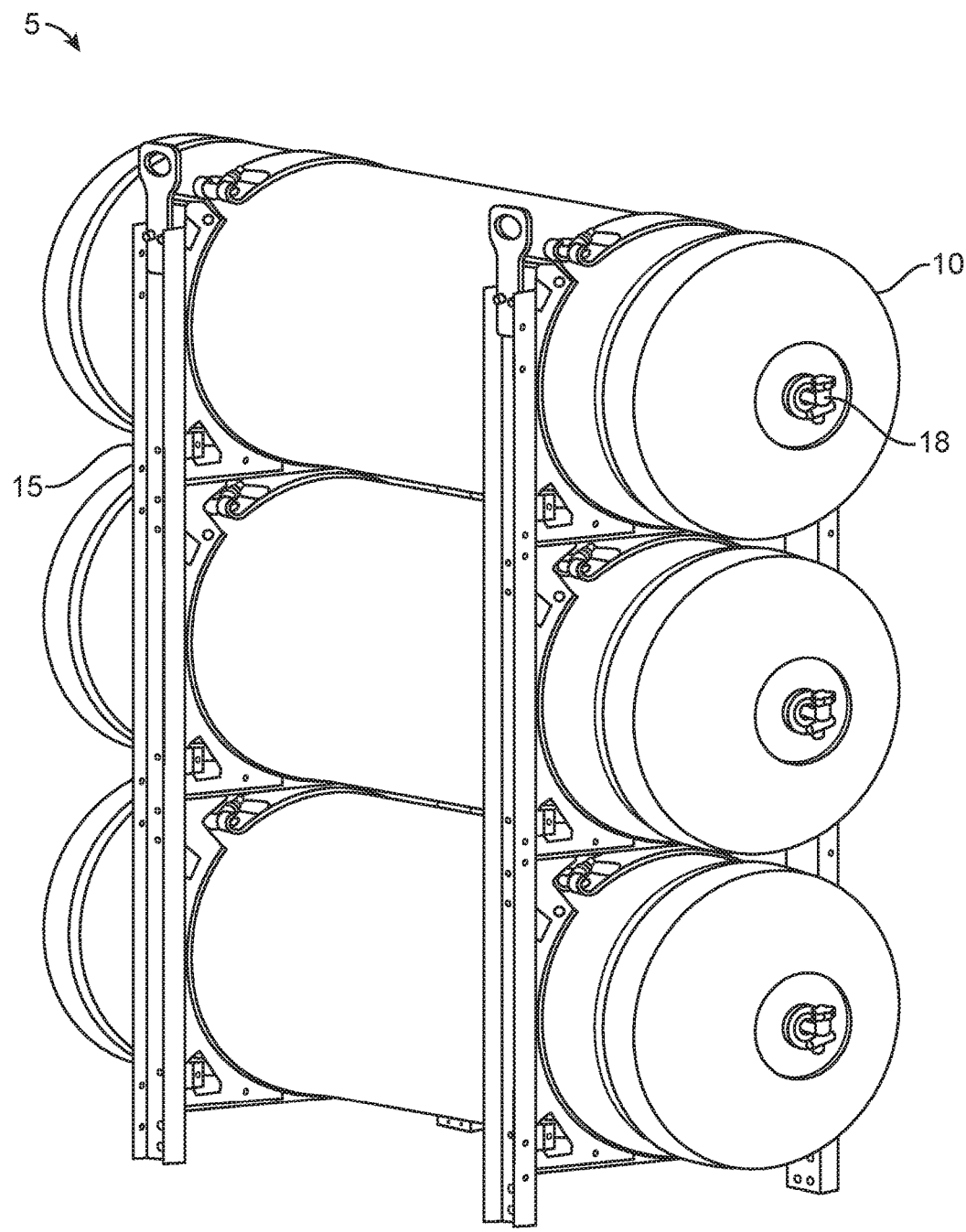
FIG. 1 is a fuel cylinder vertical rack for a tractor trailer.
Figure 2:
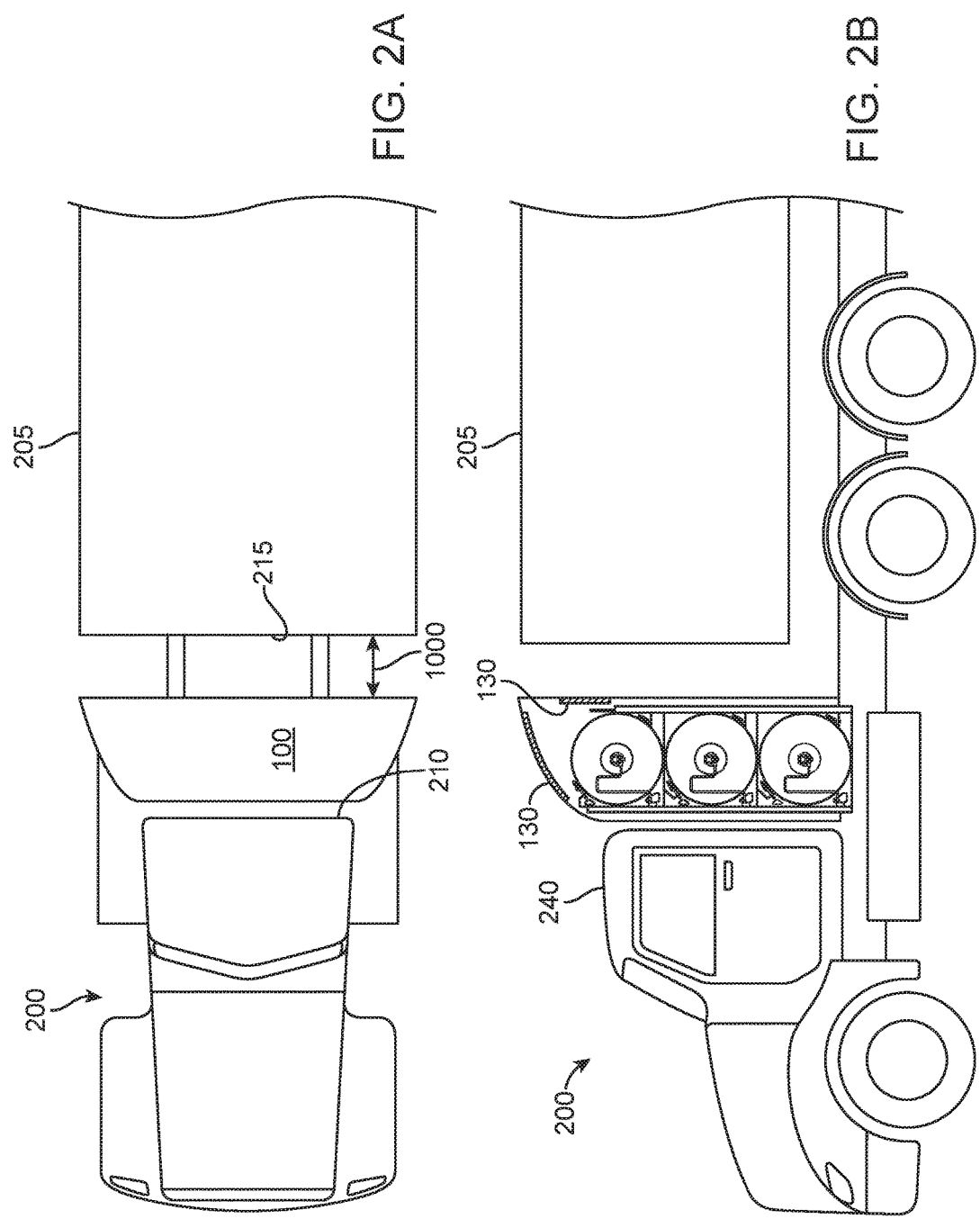
FIGS. 2A and 2B are top and side views of an aerodynamic tank enclosure.

As shall be appreciated by those having ordinary skill in the art, the figures are not to scale, and modifications to scale within a figure or across the figures are considered within the present disclosure.

FURTHER DISCLOSURE

According to one or more exemplary implementations, as shown in FIGS. 1-8 there are disclosed methods, devices and systems of lightweight enclosures 100/300/400/500/600/700 to protect gaseous fuel tanks on a vertical rack 15. In some instances aspects of the enclosures reduce turbulent airflow around at least one of the tractor 200, trailer 205 and the gap 1000 between the back of the tractor cab 210 and the front of the trailer 215. In some instances aspects of the enclosures increase the laminar airflow around at least one of the tractor, trailer and the gap 1000 between the back of the tractor and the front of the trailer. By smoothing and redirecting turbulent airflow fuel efficiency is improved. In some instance the enclosure and/or enclosure extension combination optimizes the aerodynamic contour of the airflow between the back of tractor cab and trailer. Those of ordinary skill in the art will understand that the back of cab can include a back of cab sleeper behind the driver's cab and such a configuration is within the scope of this disclosure. In some instance one or more of the surfaces forming the enclosure are flat, concave, convex, or a combination of these shapes. Although not shown the enclosure may include ducting of airflow in or out of the enclosure including but not limited to NACA duct or ducts, positive shaped NACA duct or ducts which displace airflow. Other surface features for shaping the airflow or reducing turbulence include dimples similar to a golf ball, bumps which would be the opposite of dimples, creases or sharp edges with or without sculpted areas that could be concave or convex, fins, protrusions or aerodynamic guides. Those of ordinary skill in the art will recognize that other features which may fine tune the control of airflow via the enclosure include strakes or spoilers to assist in air flow control between front drivers and trailer cab and that such elements are within the scope of this disclosure. Generally the disclosure in U.S. Pat. No. 5,058,837 provides information on aspects of some low drag features.

Figure 3:
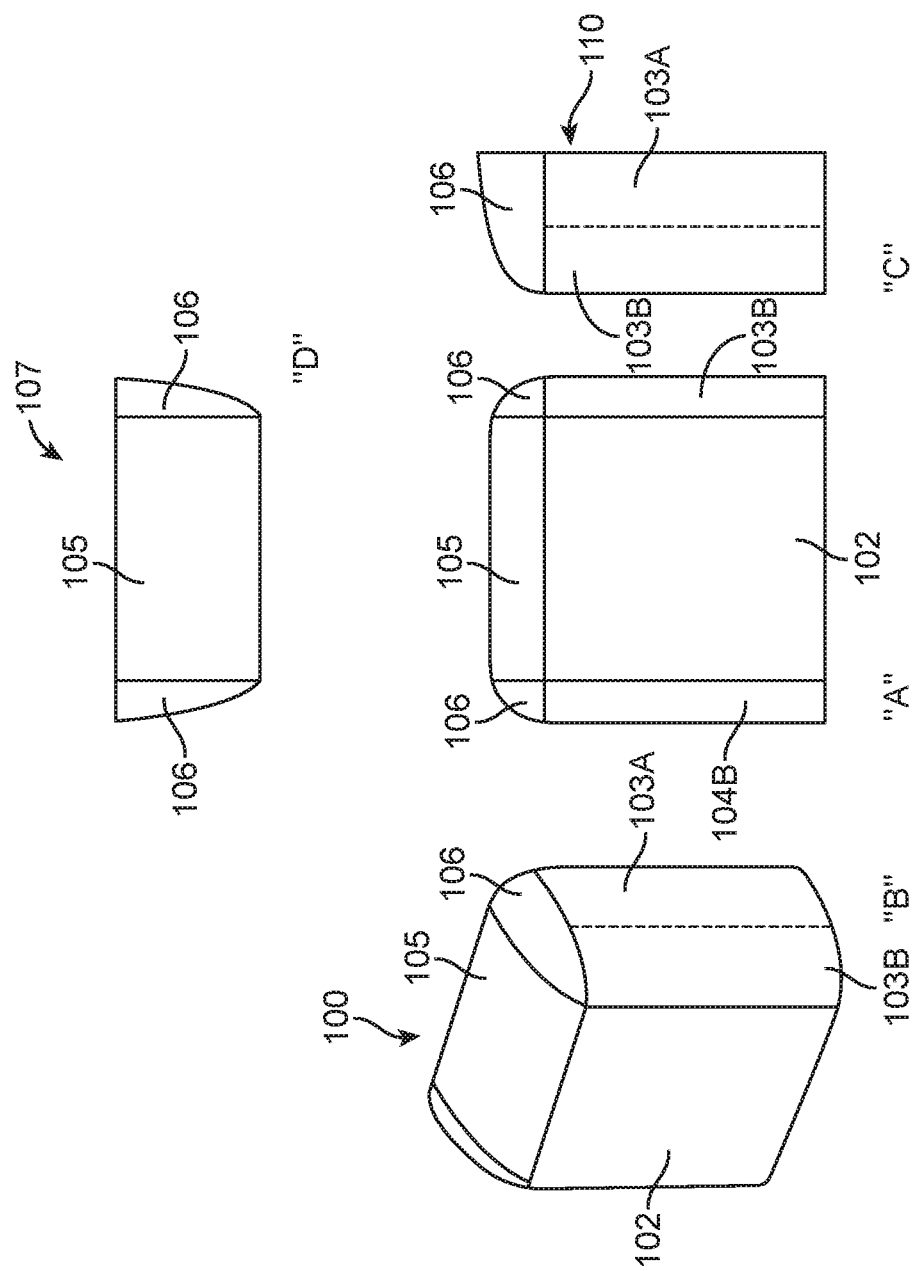
FIG. 3 illustrates four views of an aerodynamic enclosure of the present disclosure.

FIG. 3 illustrates aspects of four views an aerodynamic tank enclosure of the disclosure. The enclosure has an outer surface and an interior. It may be a unitary enclosure or may be a combination of pieces. The outer surface or exterior of the enclosure forms smooth and radiuses transitions between front, side, and top surfaces. The enclosure is formed of a vertical planar front 102, a substantially vertical planar right side 103A connected to the front 102 via a curved right side member 103B, a substantially vertical planar left side 104A connected to the front 102 via a curved left side member 104B. The front, left side and right sides transition into the top 105. A back surface 110 which is substantially vertical and planar completes the enclosure. The back surface is connected at the back of the top 107 substantially perpendicular with a minimal radius. The top connects to the left side and right side via curved top corners 106. The enclosure may be a single molded material, a laminated material or a layered combination of materials. Utilizing smooth transitions of wall connections between sides and top can optimize laminar airflow over the enclosure and between the enclosure tractor and or trailer. Utilizing surface configurations on the enclosure can optimize laminar airflow and/or reduce turbulent airflow.

Lower weight and higher strength may be achieved by utilizing materials such as fiber reinforced plastics including but not limited to resin. In some instances a laminated semi ridged foam or a honeycomb layer may be added where for at least one of energy absorption, reinforcement and structural considerations.

Additional technique of forming includes Roto Molding process utilizing a heat cured plastic resin matrix or a vacuum forming process whereby sheets of thermo set plastic material are used to form the enclosure or any part thereof.

Properties of material suitable for the enclosure are those at least one of which absorb, diffuse and reduce impact damage, add strength, add stability, minimize weight, and provide visual access to the enclosure. A nonexclusive list of materials include but are not limited organic or non-organic, ridged or flexible, in the form of solid, sheet, cloth, tubing, honeycomb, molded to shape, metallic, closed or open cell foam, fibrous material, spherical beads, plastic, hardened or cured resin, rubber, glass or a naturally formed composition such as but not limited to wood. The material used for manufacture could be used in singular form or in any combination with other forms or material types mentioned.

Depending on the intended use environment and weight/cost consideration laminate structure may be used in forming at least part of the enclosure or extension. Such laminates are referred to as sandwich of composite layup and provide one or more of the qualities of energy absorption, structural reinforcement. Alternatively, an energy absorbing and/or structural reinforcement material could be adhesively bonded to, or mechanically fastened to the inside or the outside, or in combination (inside and outside) of the enclosure to localize, absorb, diffuse and reduce any impact or other damage to the enclosure, fuel tanks, and any associated components which the enclosure(s) protect. Energy absorbing and/or structural reinforcement material may add rigidity to the enclosure or extension.

Optionally, an interior buffer 130 to further protected one or more of the fuel tanks and the fuel tank support systems with an enclosure a flexible a rubber or rubber-like like plastic sheet such as Aramid or foam material (not shown) may be applied via adhesive or mechanical bonding to the inside surface of the cover shell.

Figure 4:
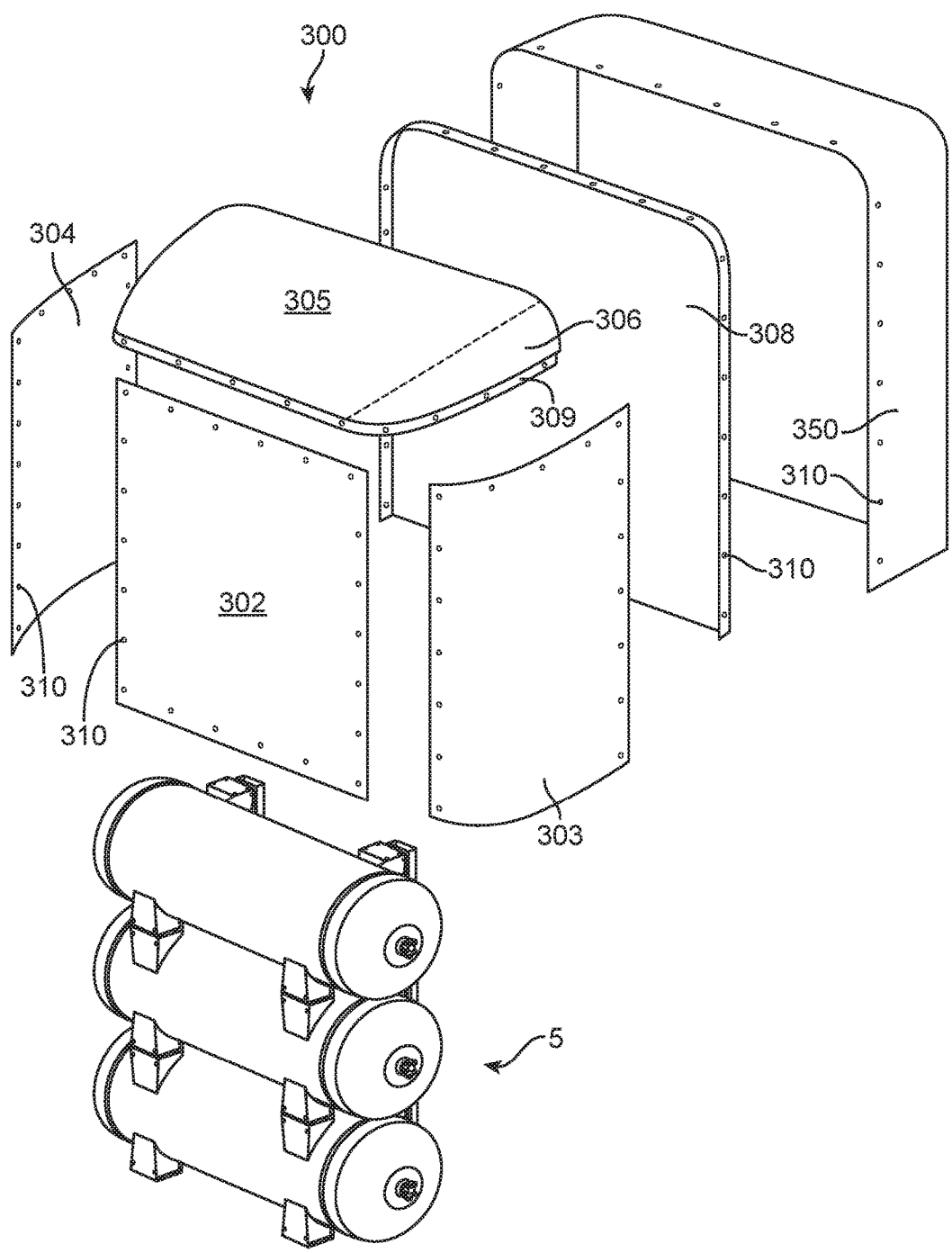
FIG. 4 shows an assembly view of another tank enclosure.
Figure 5:
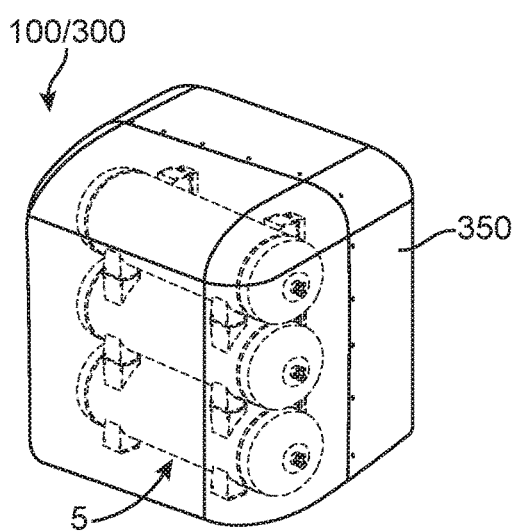
FIG. 5 is an aerodynamic tank enclosure with extension.

FIG. 4 illustrates aspects of an aerodynamic tank enclosure 300 of the disclosure. The enclosure is formed from a combination of pieces. The enclosure forms smooth transitions between front 302, right side 303, left side 304, top 305 surfaces, and a back 308. The pieces may be held together mechanically (with fasteners), or by adhesives, or by a combination of fasteners and adhesives. Fastener guides 309 and holes 310 may be formed around the periphery of the pieces to facilitate assembly. Also shown is an optional gap extension 350. The gap extension is a "U" shaped member which attaches to the enclosure and fills the air gap 1000 between the back of the cab 210 and the trailer 300. The extension may be formed as a part of the enclosure or as at least a portion of a wall of the enclosure. The air gap is a region of increased turbulence and the extension 350 improves laminar airflow. FIG. 5 illustrates the combination of the extension 350 and the unitary enclosure of FIG. 3.

Figure 6:
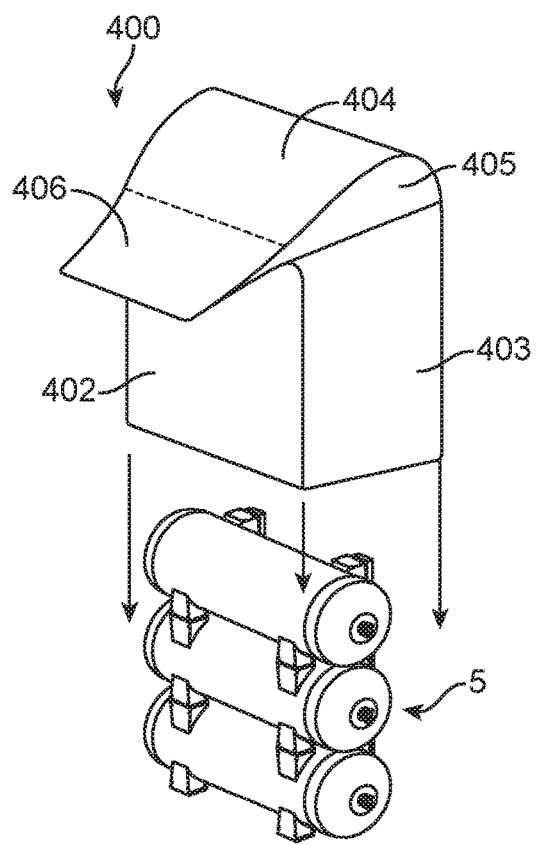
FIG. 6 is an assembly view of an aerodynamic tank enclosure over a rack of tanks; and, FIGS. 7A and 7B are top and side views of an aerodynamic tank enclosure.
Figure 7A:
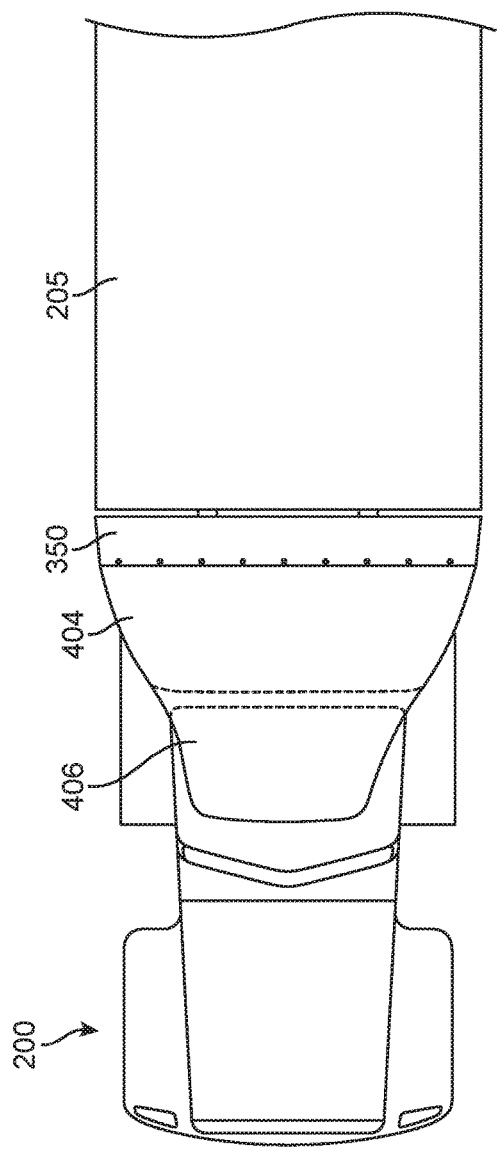
Figure 7B:
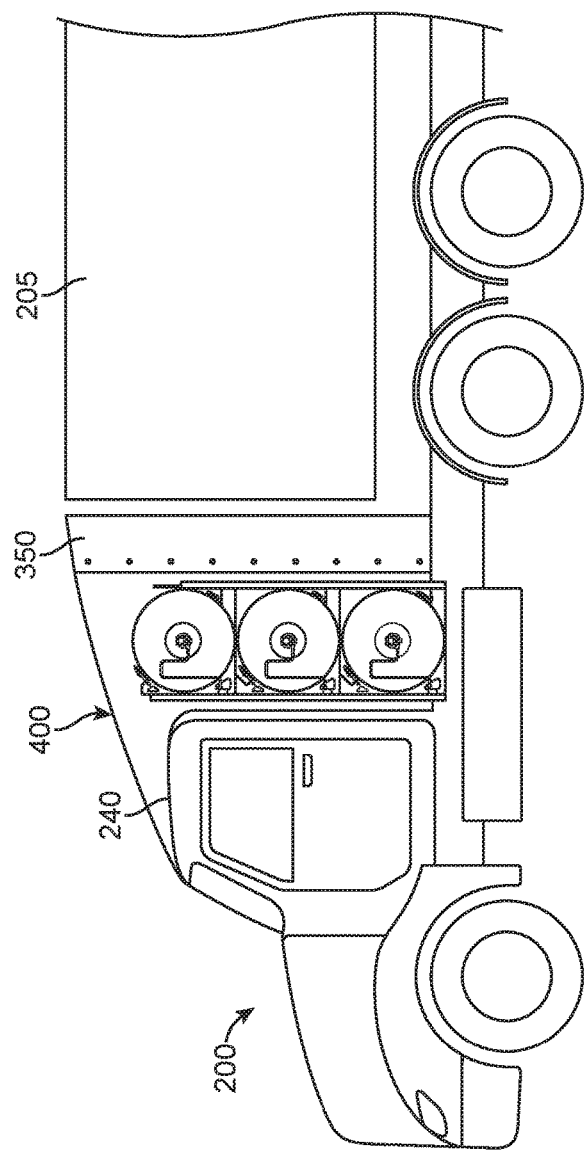

FIG. 6 is an aerodynamic enclosure 400 which forms smooth transitions between front 402, right side 403, left side (not shown but a mirror of right side), and top 404. Radiused corner regions 405 form transitions from the sides to the top. An aerodynamic shape 406 may be added as a top extension whereby the transition from the roof 240 of a cab to the top 404 is optimized to improve laminar airflow. Those of ordinary skill in the art will recognize that such shapes include air foils, sharp edges, and curved edge shapes such as ¼ and ½ spherical and combinations and intermediaries thereto. FIGS. 7A and 7B depict an implementation of an aerodynamic enclosure 400 on a tractor trailer.

The above exemplars may include one or more fixed, movable or removable windows, doors, hatches and panels to access or view tanks, valves, electrical outlets, fasteners, air, oil, gas or fuel fittings, duct work (if any) within the enclosure.

Figure 8:
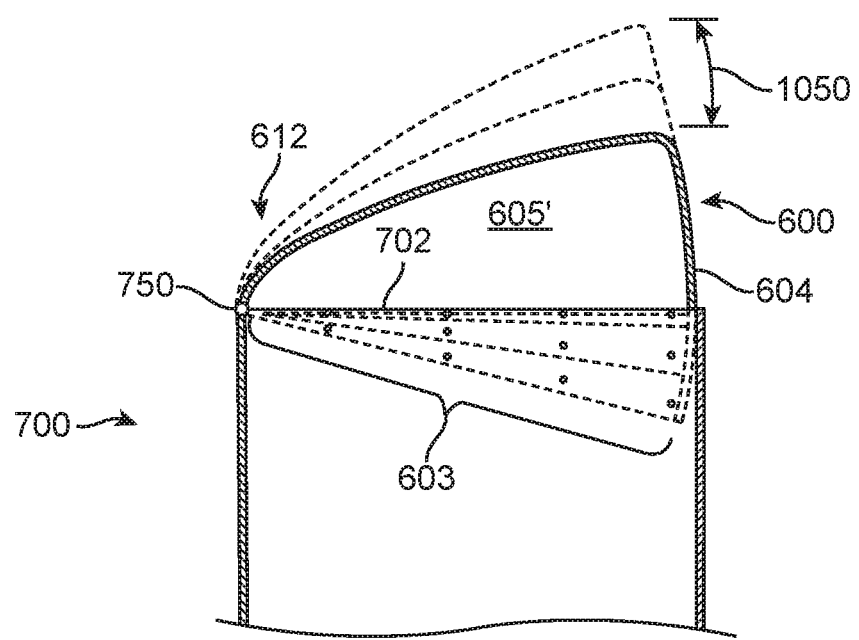
FIG. 8 is a fine tuning adjustment for a aerodynamic tank enclosure.

FIG. 8 shows a diagrammatic cut-away side view of an aerodynamic top enclosure referred to as a topper 600. A topper 600 may be formed as a container with an open end 603 a back wall 604, a left top side panel (LTSP) 605, and a right top side panel (RTSP) 605'. The back and side panels transition smoothly to the top panel 605. The topper 600 is preferably formed of one piece. The topper 600 fits into an enclosure surrounding tanks on a rack 700. The enclosure 700 is substantially an open ended box structure with an open bottom (not shown) and an open top 702. The structure is formed of a front wall 703, two side walls 704, and a back wall 705. The bottom edge 610 of the topper 600 fits into the enclosure 700 via its open top 702. The topper is mated with the enclosure 700 in a movable fashion via one or more hinges 750 at the front of the enclosure. The side panels of the topper are asymmetrical whereby it forms a roughly triangular shape with the front 612 being roughly a point and the back 604 being much wider. The topper may be rotated along the line of arrow 1050 to adjust its height and angle of incline. Once adjusted fasteners may be inserted through the enclosure to the topper to hold it in a fixed position. Additional internal framing structure (not shown) may be utilized to support the fastened connections between topper 600 and enclosure 700. The adjustability allows one enclosure and one topper to be customized to optimize airflow on a multitude of vehicle combinations.

While the method and agent have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. An aerodynamic system to protect tanks behind a cab comprising:
    a fuel system (5) containing gaseous fuel tanks (10) on a rack (15);
    a unitary piece enclosure (100) having an outer surface of a size and shape to fit over said fuel system the enclosure having a front (102), a topper (600), a back (110), and two sides (103/104);
    the topper (600) fits at least partially into said enclosure and is moveably connected via one or more hinges to the front of an enclosure; and,
    wherein the topper may be rotated along the one or more hinges to select an angle or inclination and height and then fixed in place at the angle of inclination and height; and,
    wherein the enclosure is configured to receive the sides of the topper.

2. The system of claim 1 the enclosure further comprising at least one of a window, door, hatch and panel whereby at least the tanks and valves (18) may be viewed or accessed.

3. The system of claim 1 wherein the outer surface of the enclosure has at least one of the following surface features: dimples, bumps.

4. The system of claim 1 wherein the outer surface of enclosure has one or more regions that are concave.

5. The system of claim 1 further comprising an interior buffer (130).

6. The system of claim 1 further comprising the fuel system and the enclosure mounted to a tractor (200) behind the cab (210).

7. The system of claim 6 further comprising a trailer (205) affixed to the tractor forming an air gap (1000) between the enclosure and the front of the trailer (215).

8. The system of claim 7 further comprising an extension (350) affixed to the enclosure to reduce the size of the gap.

9. A behind the cab aerodynamic enclosure system covering a vertical rack of fuel tanks comprising:
    a unitary piece enclosure (100) having a front (102), a back (110), and two sides (103/104);
    a topper (600) is moveably connected via one or more hinges to the front of the enclosure; and,
    wherein the topper is configured to rotate the sides of the topper at least partially within the enclosure to select an angle or inclination and height and then fixed in place at the angle of inclination and height.

10. The system of claim 9 wherein the unitary piece enclosure further comprises at least one of a window, door, hatch and panel whereby the interior can be viewed or accessed.

11. The system of claim 9 wherein the outer surface of the unitary piece enclosure has at least one of the following surface features: dimples, bumps.

12. The system of claim 9 wherein the outer surface of the unitary piece enclosure has one or more regions that are concave.

13. The system of claim 9 further comprising an interior buffer (130) lining at least a portion of the interior of the unitary piece enclosure.

14. A behind the cab aerodynamic enclosure system covering a vertical rack of fuel tanks comprising an enclosure configured to connect to a topper (600) via one or more hinges at a front of the enclosure; and,
    wherein at least a portion of the topper can be rotated along the one or more hinges to below an open top (1702) of the enclosure and then fixed in place at an angle of inclination and height.

15. The system of claim 14 wherein the outer surface of enclosure has at least one of the following surface features: dimples, bumps, creases, sharp edges.

16. The system of claim 14 further comprising the top an interior buffer (130) lining at least a portion of the interior of the enclosure.

* * * * *